No. 645,128. Patented Mar. 13, 1900.
L. C. REED.
SYSTEM OF ELECTRIC METERING.
(Application filed Nov. 2, 1899.)

(No Model.) 2 Sheets—Sheet 1.

Witnesses.
Inventor:
Lyman C. Reed.
By James L. Norris
Atty.

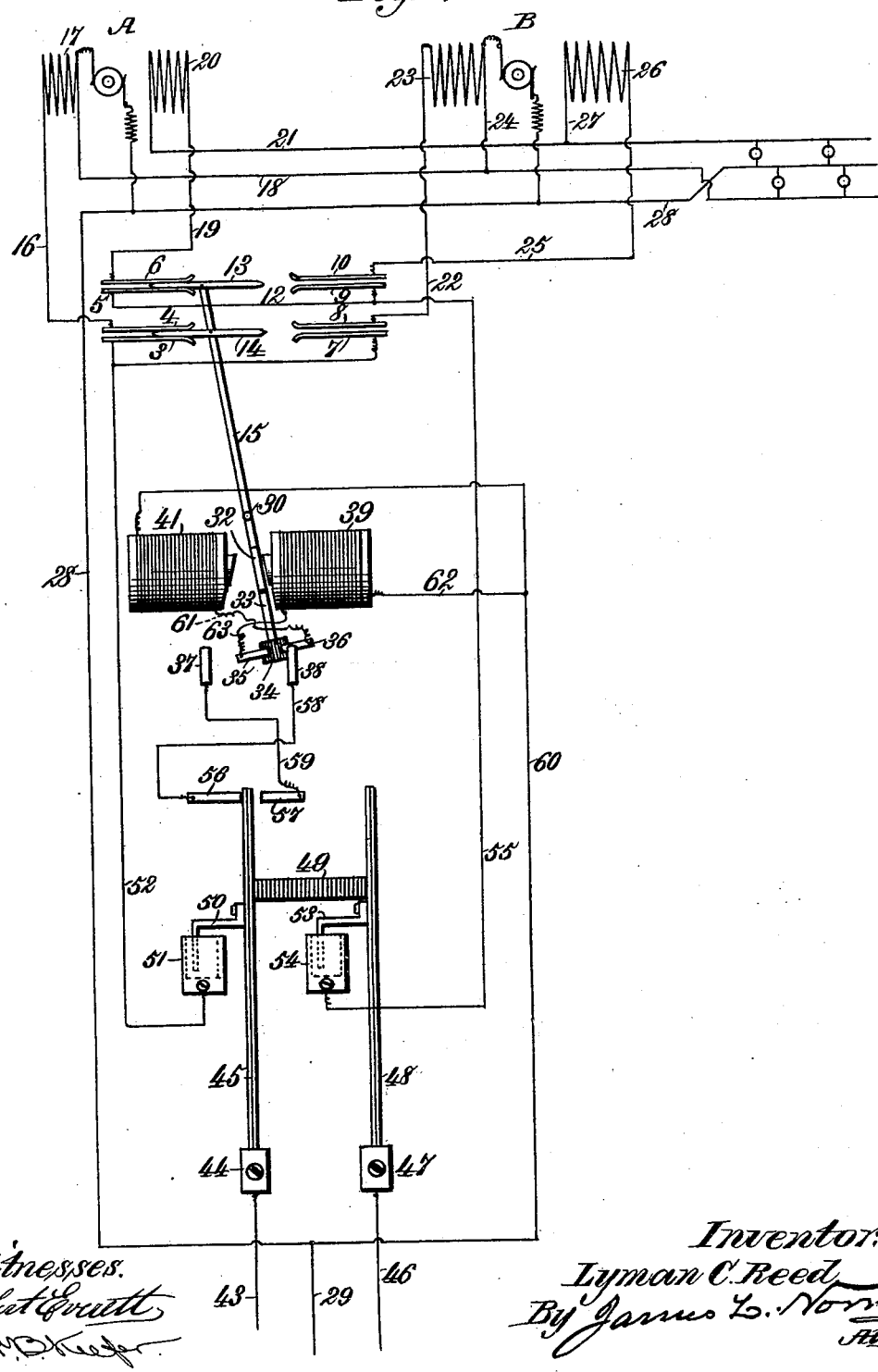

UNITED STATES PATENT OFFICE.

LYMAN C. REED, OF NEW ORLEANS, LOUISIANA.

SYSTEM OF ELECTRIC METERING.

SPECIFICATION forming part of Letters Patent No. 645,128, dated March 13, 1900.

Application filed November 2, 1899. Serial No. 735,606. (No model.)

*To all whom it may concern:*

Be it known that I, LYMAN C. REED, a citizen of the United States, residing at New Orleans, in the parish of Orleans and State of Louisiana, have invented new and useful Improvements in Systems of Electric Metering, of which the following is a specification.

My invention relates to electric metering, the object of the same being to provide means for securing accurate registration of the current consumed through all ranges of load. With meters of all sizes an incorrect measurement is made on loads bearing but a small proportion to the capacity of the meter. The point of inaccuracy is variously estimated at between ten and twenty per cent. of the capacity of the meter. I have proposed to overcome this defect by providing two meters on large installations, one of small and the other of large capacity, the small meter being intended to measure those loads which cannot be properly handled by the large one, and in an application for patent filed by me July 10, 1899, Serial No. 723,381, I have disclosed an improved form of switch which is adapted to be automatically operated for coupling in multiple two such meters when the load to be measured increases beyond the capacity of the small meter, both meters measuring those loads which cannot be properly handled by the small meter.

According to my present invention instead of coupling the two meters employed in multiple on large loads the two meters are cut into and out of circuit separately by means controlled by the quantity of current flowing.

The details of the invention will be set forth hereinafter, and the novel features thereof will be defined in the claims.

Figure 1:
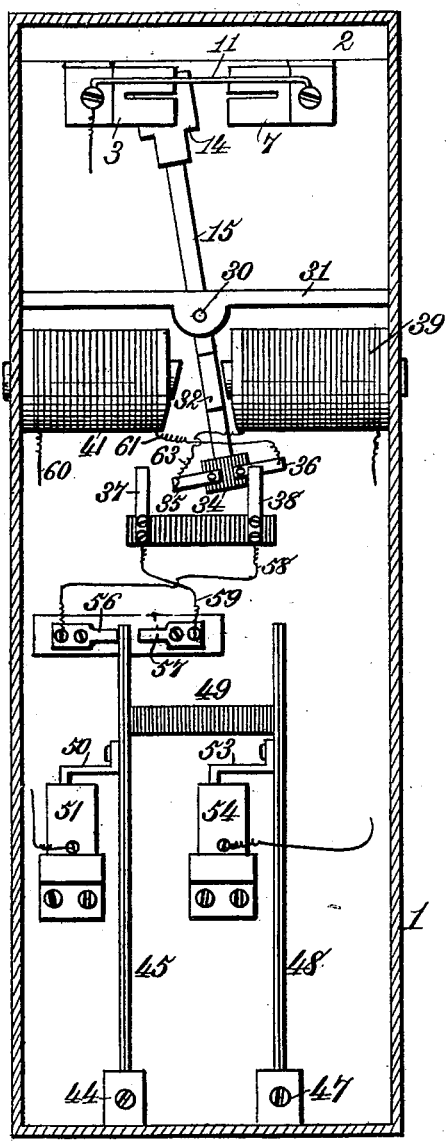
Figure 2:
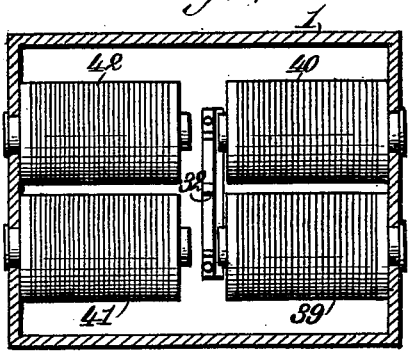

In the drawings forming part of this specification, Figure 1 is a front elevation of the switch, its operating mechanism, and the controlling means therefor, with the front of the casing in which said parts are located removed. Fig. 2 is a horizontal cross-section through the casing, taken at a point just above the actuating-magnets for the switch-lever; and Fig. 3 is a diagrammatic view illustrative of the circuit connections.

Like reference letters and numerals indicate like parts in the different views.

In a metallic box or casing 1 are mounted on an insulating-block 2 four sets of switch-contacts 3 4, 5 6, 7 8, 9 10, the contacts 3 and 7 being connected together by the conductor 11 and the contacts 5 and 9 being connected together by the conductor 12. With the switch-contacts are adapted to coöperate the switch-blades 13 and 14 on the switch-lever 15, the said blades being adapted to close the circuits between the members of the pairs of said contacts. The contact 4 is connected through the wire 16 with the positive field-coil 17 of the small meter A, from which leads the wire 18 to the translating devices. The contact 6 is connected through the wire 19 with the negative field-coil 20 of the small meter A, from which leads the wire 21 to the translating devices. The contact 8 is connected through the wire 22 with the positive field-coil 23 of the large meter B, from which leads the wire 24 to the translating devices, and the contact 10 is connected through the wire 25 with the negative field-coil 26 of the large meter B, from which leads the wire 27 to the translating devices. Each of the meters illustrated is of the ordinary Thomson three-wire type; but it is obvious that a two-wire meter of the same kind may be employed in its stead, or a two or three wire meter of any other kind may be used. The neutral-wire 28 leads from the translating devices to the main service-neutral 29.

The switch-lever 15 is fulcrumed at 30 to a cross-bar 31, secured to the box or casing 1, and has secured to it an armature 32. Attached to said armature and leading downwardly therefrom is an extension 33 of the lever 15, to which is attached an insulating-block 34. The said block has secured to it and extending in opposite directions therefrom the contacts 35 36, the same being adapted to coöperate with similar fixed contacts 37 38, respectively. The lever 15 is adapted to be rocked on its fulcrum 30, for the purpose of switching the current from one meter to the other, by means of the magnets 39, 40, 41, and 42, the said magnets being arranged in pairs, as shown, and secured by screws or other analogous means to the metallic box or casing 1, the said box or casing thereby serving as a yoke for said magnets to produce double-pole magnets thereof. The armature 32 plays between the poles of these magnets, and when one pair is energized the armature will be attracted in one direction to shift the lever 15, and when the other pair is energized the armature will be attracted in the other direction to shift said lever in a direction opposite that in which it was formerly moved.

The magnets referred to are in shunt-circuits, which are controlled by a thermostatic controller now to be described. The positive service-wire 43 leads to a binding-pole 44, which has secured to it a thermostatic element 45, composed of strips of dissimilar metals riveted together in the usual manner. The negative service-wire 46 leads to a binding-pole 47, to which is secured a second thermostatic element 48 similar to the element 45, heretofore referred to, the parts 45 and 48 being connected together at points adjacent to their free ends by an insulating-bar 49. Secured to the element 45 is a metallic lug or projection 50, which dips into the mercury-well 51, from which leads the wire 52 to the switch-contacts 3 and 7. The thermostatic element 48 has connected to it a similar lug or projection 53, which dips into the mercury-well 54, from which leads the wire 55 to the switch-contacts 9 and 5. The thermostatic element 45 plays between stationary contacts 56 57, the former of which is connected through the wire 58 with the contact 38, and the latter of which is connected through the wire 59 with the contact 37. From the service-neutral 29 leads a wire 60 to the coils of the magnets 41 and 42, and from the latter leads a wire 61 to the contact 36. The wire 62 connects the wire 60 with the coils of the magnets 39 and 40, and from said coils leads the wire 63 to the contact 35.

Let it be assumed, for the sake of illustration, that the large meter B is inaccurate on ten per cent. of its load capacity and that the small meter A is adapted to register all loads within the range of inaccuracy of registration of the large meter. When the small meter is in action, the circuit will be as illustrated in Fig. 3 of the drawings, the positive flow being from the positive service-wire 43 to the binding-pole 44, thence through thermostatic element 45, lug or projection 50, mercury-well 51, wire 52, switch-contact 3, blade 14 on switch-lever 15, switch-contact 4, wire 16, positive field 17 of meter A, and wire 18 to transmitting devices, returning over the neutral-wires 28 and 29, and the negative flow being from the negative service-wire 46 to binding-pole 47, thence through thermostatic element 48, lug or projection 53, mercury-well 54, wire 55, switch-contact 5, blade 13 on switch-lever 15, switch-contact 6, wire 19, negative field 20 of meter A, and wire 21 to translating devices, returning over neutral-wires 28 and 29. The switch-lever during the operation of the small meter A is in such position that the blades 13 and 14 thereof will, respectively, bridge the circuit across the switch-contacts 6 and 5 and 4 and 3. If the current consumed by the installation increases beyond that which the small meter A is intended to measure, the heat produced by the current passing through the thermostatic elements 45 and 48 will be sufficient to bend said elements, so as to bring the element 45 into engagement with the contact 56. The shunt-circuit, through the magnets 41 and 42, will then be closed over the following path: thermostatic element 45, contact 56, wire 58, contact 38, contact 36, wire 61, coils of magnets 41 and 42, and wire 60 to service-neutral 29. The magnets 41 and 42 being now energized will attract the armature 32 thereof, which is carried by the switch-lever 15, and throw said lever in position for the blades 13 and 14 to bridge the circuit across the switch-contacts 10 and 9 and 8 and 7, respectively. As soon, however, as the contact 36 passes beyond the contacts 38, the shunt-circuit through the magnets 41 and 42 will be broken at this point. It will thus be seen that the shunt-circuit through the actuating-magnets for the switch is closed for but an instant of time and that it is broken at a different point from that at which it is closed. When the armature 32 lies in contact with the poles of the magnets 41 and 42, contact is made between the contacts 35 and 37 for a purpose which will presently appear. It will be observed that when the large meter B is thrown into the circuit by the operation of the switch-lever 15 just described, the small meter A will be simultaneously thrown out of circuit. The switch-contacts and the blades 13 and 14 on the switch-lever 15 are so arranged relatively to each other, however, that said blades will bridge the circuit between the opposite pairs of switch-contacts, and for an instant of time the meters A and B will be in multiple with each other, this arrangement being for the purpose of preventing arcing. With the parts in the position last described the current-flow through the large meter B is as follows: from positive service-wire 43, through binding-pole 44, thermostatic element 45, lug or projection 50, mercury-well 51, wire 52, switch-contact 7, blade 14 on switch-lever 15, switch-contact 8, wire 22, positive field 23 of meter B, and wire 24 to translating devices, returning over neutral-wire 28 to service-neutral 29, and from negative service-wire 46, through binding-pole 47, thermostatic element 48, lug or projection 53, mercury-well 54, wire 55, switch-contact 9, blade 13 on switch-lever 15, switch-contact 10, wire 25, negative field 26 of meter B, and wire 27 to translating devices, returning over the neutral-wire 28 to service-neutral 29. Should the load now fall to the point where it is intended that the small meter shall act, the heat generated by the current in the thermostatic elements 45 and 48 will likewise decrease and the element 45 will be moved away from the contact 56 and into engagement with the contact 57. The shunt-circuit through the magnets 39 40 will now be closed over the following path: thermostatic element 45, contact 57, wire 59, contacts 37 and 35, wire 63, coils of magnets 39 and 40, and wires 62 and 60 to service-neutral 29. The magnets 39 40 being now energized will move the switch-lever 15 into the position in which it is shown in Fig. 3 of the drawings, closing the circuit through the small meter A over the paths heretofore described. As the lower end of the lever 15 is drawn toward the magnets 39 and 40, the contacts 35 and 37 will be moved out of engagement with each other, and the shunt-circuit will be broken at this point. It will thus be seen that when the magnets 39 40 and 41 42 are energized they remain so just long enough to enable them to actuate the switch-lever 15.

It is obvious that for the thermostatic controller herein shown and described I may substitute any other form of controller adapted for the purpose. The thermostatic controller, however, operates not only upon a fixed current, but is affected by the condition of the surrounding atmosphere—that is to say, assuming that the temperature at which the thermostat acts to cut in the shunt-circuit be 100° Fahrenheit and the surrounding atmosphere 80° Fahrenheit, the difference, 20°, will represent a definite amount of current flowing. If, however, the surrounding atmosphere be 60°, the thermostat has still to attain 100° temperature before the shunt-circuit will be cut in; but as the fields of the meters will be working under cooler conditions they will be able to stand more current. The ratio of heating the meter-fields and the thermostat may therefore be taken as a constant. The positive and negative thermostatic elements 45 and 48, respectively, being coupled near their free ends by the insulating-bar 49, form a single unit, by which the shunt-circuit is controlled by the sum of the currents flowing.

It will be observed that only a fixed quantity of current is ever switched over, as the circuit is always broken at a definite point, whether the load be on the increase or decrease. On a large insulation—say of five hundred lights—the ratio between the two meters would be approximately one to ten, so that the current switched over from one meter to the other would never exceed that used by fifty lights. The large meter would, therefore, never be in circuit on less than fifty lights and the small meter would register all current used by less than fifty lights. This example, of course, is merely illustrative.

The invention has been shown and described in connection with a three-wire system of distribution. It is obvious that it is equally well adapted to a two-wire system and is designed to be used on either direct or alternating current.

Having now described my invention, what I claim as new, and desire to secure by Letters Patent, is—

1. In a system of electric metering, the combination of a plurality of meters, and means actuated by the quantity of current flowing for separately cutting said meters into the circuit.

2. In a system of electric metering, the combination of a plurality of meters, a switch, and means actuated by the quantity of current flowing for operating said switch to separately cut said meters into the circuit.

3. In a system of electric metering, the combination of a plurality of meters, a switch for separately cutting said meters into the circuit, and electromagnets for actuating said switch independently energized by means controlled by the quantity of current flowing.

4. In a system of electric metering, the combination of a plurality of meters, a service-circuit through said meters, and an automatic circuit-controller actuated by the quantity of current flowing for separately cutting said meters into said circuit.

5. In a system of electric metering, the combination of a plurality of meters, a service-circuit through said meters, and a thermostatic circuit-controller for cutting said meters into said circuit.

6. In a system of electric metering, the combination of a plurality of meters, a service-circuit through said meters, a switch for separately cutting said meters into said circuit, electromagnets for actuating said switch and shunt circuits through said magnets controlled by the quantity of current flowing.

7. In a system of electric metering, the combination of a plurality of meters, a service-circuit through said meters, a switch for separately cutting said meters into said circuit, electomagnets for actuating said switch, shunt-circuits through said magnets, and an automatic circuit-controller therefor actuated by the quantity of current flowing.

8. In a system of electric metering, the combination of a plurality of meters, a service-circuit through said meters, a switch for separately cutting said meters into said circuit, actuating means for said switch, and an automatic circuit-controller therefor, actuated by the quantity of current flowing.

9. In a system of electric metering, the combination of a plurality of meters, a service-circuit through said meters, a switch for separately cutting said meters into said circuit, actuating means for said switch, and a thermostatic circuit-controller for said actuating means.

10. In a system of electric metering, the combination of a plurality of meters, a service-circuit through said meters, a switch for separately cutting said meters into said circuit, electromagnets for actuating said switch, shunt-circuits through said magnets, and a thermostatic circuit-controller for said shunt-circuits.

11. In a system of electric metering, the combination of a plurality of meters, a service-circuit through said meters, a switch for cutting said meters into said circuit, electromagnets for actuating said switch, shunt - circuits through said magnets and a thermostatic circuit-controller in said service-circuit for closing said shunt-circuits.

12. In a system of electric metering, the combination of a plurality of meters, a service-circuit through said meters, a switch for cutting said meters into said circuit, eletromagnets for actuating said switch, shunt-circuits through said magnets, and a thermostatic circuit-controller in said service-circuit, the same comprising two thermostatic elements composed of strips of dissimilar metals, an insulator connecting said elements, and contacts in said shunt-circuits, through which and one of said thermostatic elements said shunt-circuits are adapted to be separately closed.

13. In a system of electric metering, the combination of a plurality of meters, a service-circuit through said meters, a switch for cutting said meters into said circuit, electromagnets for actuating said switch, shunt-circuits through said magnets, and a thermostatic circuit-controller in said service-circuit, the same comprising two thermostatic elements composed of strips of dissimilar metals, an insulator connecting said elements, and contacts in said shunt-circuits, through which and one of said thermostatic elements said shunt-circuits are adapted to be separately closed.

14. In a system of electric metering, the combination of a plurality of meters, a service-circuit through said meters, a switch for cutting said meters into said circuit, electromagnets for actuating said switch, shunt-circuits through said magnets, and a thermostatic circuit-controller in said service-circuit, the same comprising two thermostatic elements composed of strips of dissimilar metals, an insulator connecting said elements, and fixed contacts in said shunt-circuits, adapted to be engaged by one of said thermostatic elements, as and for the purpose set forth.

15. In a system of electric metering, the combination of a plurality of meters, a service-circuit through said meters, a switch for cutting said meters into said circuit, including a switch-lever, an armature carried by said lever, an insulating-block also carried by said lever, contacts 35, 36 on said block, electromagnets on opposite sides of said armature for actuating said lever, contacts 37, 38 with which the contacts 35, 36 are adapted to respectively engage, contacts 56, 57 connected with the contacts 38 and 37, respectively, a shunt-circuit through one of said magnets including the contacts 56, 38 and 36, a shunt-circuit through the other of said magnets including the contacts 57, 37 and 35 and a thermostatic circuit-controller in said service-circuit, the same comprising two thermostatic elements 45, 48, composed of strips of dissimilar metals, one of which elements is adapted to engage the contacts 56 and 57, and an insulating connection between said elements, as and for the purpose set forth.

In testimony whereof I have hereunto set my hand in presence of two subscribing witnesses.

LYMAN C. REED.

Witnesses:
  D. O'DAY,
  H. H. WATEES.